(12) United States Patent
Mital et al.

(10) Patent No.: US 9,613,084 B2
(45) Date of Patent: Apr. 4, 2017

(54) USING CINEMATIC TECHNIQUES TO PRESENT DATA

(75) Inventors: Vijay Mital, Kirkland, WA (US); Suraj T. Poozhiyil, Redmond, WA (US); Darryl Rubin, Duvall, WA (US); Amir Netz, Bellevue, WA (US); Olivier Colle, Bellevue, WA (US); Andrew Douglas Reddish, Redmond, WA (US); Christian Beaumont, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 483 days.

(21) Appl. No.: 13/495,952

(22) Filed: Jun. 13, 2012
(Under 37 CFR 1.47)

(65) Prior Publication Data
US 2013/0339351 A1    Dec. 19, 2013

(51) Int. Cl.
*G06F 13/30* (2006.01)
*G06F 17/30* (2006.01)
*G06T 13/00* (2011.01)

(52) U.S. Cl.
CPC .. *G06F 17/30386* (2013.01); *G06F 17/30554* (2013.01); *G06T 13/00* (2013.01)

(58) Field of Classification Search
None
See application file for complete search history.

(56) References Cited

U.S. PATENT DOCUMENTS

| | | | |
|---|---|---|---|
| 6,137,499 A | 10/2000 | Tesler | |
| 7,975,226 B2 | 7/2011 | Blose et al. | |
| 7,975,239 B2 | 7/2011 | Bellotti et al. | |
| 8,296,675 B2 | 10/2012 | Falchuck | |
| 2004/0008180 A1 | 1/2004 | Appling, III | |
| 2004/0054542 A1* | 3/2004 | Foote et al. | 704/500 |
| 2005/0265580 A1 | 12/2005 | Antonucci et al. | |
| 2005/0268279 A1* | 12/2005 | Paulsen | G06F 8/38 717/110 |
| 2008/0309647 A1* | 12/2008 | Blose et al. | 345/204 |
| 2009/0027549 A1 | 1/2009 | Weisgerber | |
| 2009/0094518 A1 | 4/2009 | Lawther et al. | |
| 2009/0216808 A1 | 8/2009 | Wallace | |
| 2009/0307207 A1* | 12/2009 | Murray | 707/5 |

(Continued)

OTHER PUBLICATIONS

"International Search Report & Written Opinion for PCT Patent Application No. PCT/US2013/043960", Mailed Date: Dec. 9, 2013, Filed Date: Jun. 4, 2013, 8 Pages.

(Continued)

*Primary Examiner* — Xiao Wu
*Assistant Examiner* — Yu Chen
(74) *Attorney, Agent, or Firm* — Workman Nydegger

(57) ABSTRACT

The present invention extends to methods, systems, and computer program products for using cinematic techniques to present data. Embodiments of the invention can be used to infer and generate cinematic techniques or combinations thereof based on a model and user action. Cinematic techniques can be used to meet the data exploration and analysis requirements of a user. As such, embodiments of the invention permit users (including non-programmers) to employ cinematic techniques (possibly in combination with other techniques) to gain insights into their data and also convey appropriate emotional messages.

20 Claims, 2 Drawing Sheets

(56) References Cited

U.S. PATENT DOCUMENTS

| | | | |
|---|---|---|---|
| 2010/0037138 | A1 | 2/2010 | Scherbakov et al. |
| 2010/0057618 | A1 | 3/2010 | Spicer et al. |
| 2010/0118049 | A1 | 5/2010 | Bobrow et al. |
| 2010/0194778 | A1 | 8/2010 | Robertson et al. |
| 2010/0199181 | A1 | 8/2010 | Robertson et al. |
| 2010/0229121 | A1 | 9/2010 | Falchuck |
| 2011/0093805 | A1 | 4/2011 | Ekhager et al. |
| 2011/0106589 | A1 | 5/2011 | Blomberg et al. |
| 2011/0131496 | A1 | 6/2011 | Abram et al. |
| 2011/0249003 | A1 | 10/2011 | Mercuri |
| 2012/0260172 | A1 | 10/2012 | Friedlander et al. |
| 2013/0330056 | A1* | 12/2013 | Abecassis ............... 386/241 |
| 2013/0335420 | A1 | 12/2013 | Mital et al. |
| 2013/0339860 | A1 | 12/2013 | Mital et al. |
| 2014/0129942 | A1* | 5/2014 | Rathod ............ H04N 21/44222 715/720 |

OTHER PUBLICATIONS

Wang, et al., "Film Narrative Exploration Through the Analysis of Aesthetic Elements", In Proceedings of 13th International Multimedia Modeling Conference, vol. 4351, Jan. 9-12, 2007, pp. 606-615.

Hsueh, Michael, "PhotoVis: Visualization of Digital Photograph Metadata", In Technical Report of Electrical Engineering and Computer Sciences University of California at Berkeley, May 9, 2011, 10 pages.

Keim, Daniel A., "Information Visualization and Visual Data Mining", In Proceedings of IEEE Transactions on Visualization and Computer Graphics, vol. 7, Issue 1. Jan.-Mar. 2002, pp. 100-107.

Gobel, et al., "INVISIP: Metadata-based Information Visualization Techniques to Access Geodata Archives and to Support the Site Planning Process", In Proceedings of 3rd CODATA Euro—American Workshop on Information Visualization Presentation and Design, Jul. 10-11, 2002, 4 pages.

Cruz, et al., "A Layered Architecture for the Exploration of Heterogeneous Information Using Coordinated Views", In Proceedings of IEEE Symposium on Visual Languages—Human Centric Computing, Sep. 26-29, 2004, pp. 11-18.

Manovich, Lev, "Media Visualization: Visual Techniques for Exploring Large Media Collections", Published on: Jun. 2011, Available at: http://manovich.net/DOCS/media_visualization.2011.pdf.

Moroney, Laurence, "Visualizing Information with .NET", In MSDN Magazine, Aug. 2009.

Bichler, Patrick, "Visualization Framework for Information Graphs an Incremental Approach", Published on: Feb. 2002, Available at: http://e-collection.library.ethz.ch/eserv/eth:25004/eth-25004-01.pdf.

Gasser, Ray, "Using MATLAB to Visualize Scientific Data", Published on: Aug. 28, 2009, Available at: http://www.bu.edu/tech/research/training/tutorials/visualization-with-matlab/.

Heer, et al., "Animated Transitions in Statistical Data Graphics", In IEEE Transactions on Visualization and Computer Graphics, vol. 13, No. 6, Nov.-Dec. 2007, pp. 1240-1247.

Office Action dated Oct. 7, 2014 cited in U.S. Appl. No. 13/517,516.

Office Action dated Jan. 7, 2015 cited in U.S. Appl. No. 13/495,979.

Notice of Allowance dated May 5, 2015 cited in U.S. Appl. No. 13/517,516.

Office Action dated Jun. 10, 2015 cited in U.S. Appl. No. 13/495,979.

Notice of Allowance dated Mar. 14, 2016 cited in U.S. Appl. No. 13/495,979.

Office Action dated Oct. 26, 2015 cited in U.S. Appl. No. 13/495,979.

Office Action cited in Chinese Application No. 201380031177.1 dated Nov. 22, 2016.

* cited by examiner

USING CINEMATIC TECHNIQUES TO PRESENT DATA

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Users can gain or share insight on their data through visualizations like charts, graphs, maps and hierarchies. These visualizations have simple and commonly used mechanisms using object color (hues, saturation and transparency), text (font families and styles) and visibility to emphasize, denote selection and highlight insights for exploring and analyzing the underlying data. In some environments, due at least in part to their simplicity, these visualizations make it difficult for users to effectively gain/share insights about their data. In turn, it is also difficult to convey an appropriate emotional message and have a highly interactive user experience.

BRIEF SUMMARY

The present invention extends to methods, systems, and computer program products for using cinematic techniques to present data. A portion of data is accessed from a data repository. The portion of data has meaning based on data values contained in the portion of data. User requirements for presenting the portion of data are accessed. The user requirements indicate a user desired message to convey when presenting the portion of data.

One or more cinematic techniques are identified for presenting data in a manner that conveys the user desired message. The cinematic techniques relate to one or more of: camera position, lighting, movement, and transitions. The portion of data is presented at a display device to convey the user desired message. The user desired message is conveyed by presenting the values contained in the portion of data in accordance with the one or more identified cinematic techniques.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
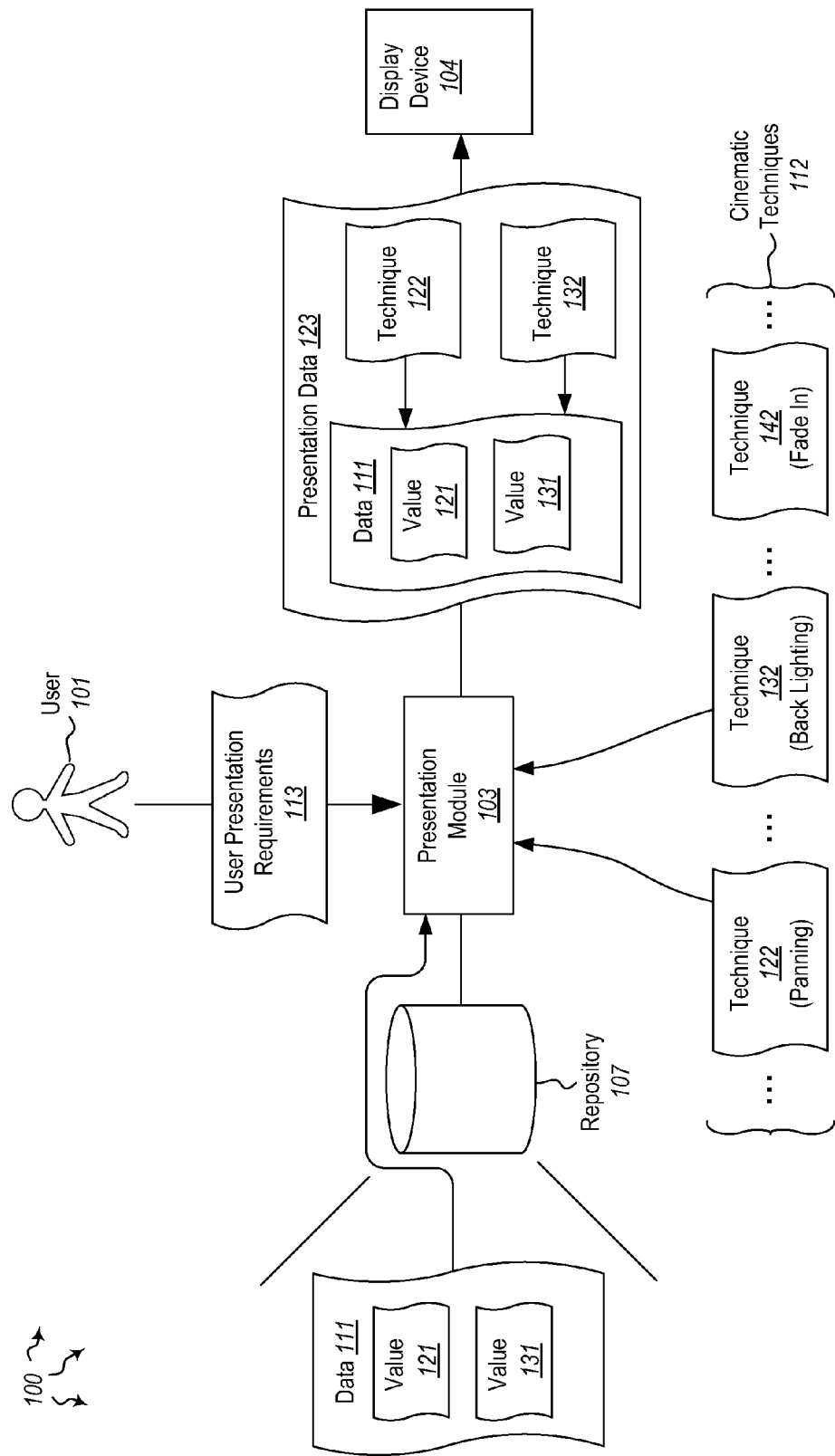
FIG. 1 illustrates an example computer architecture that facilitates using cinematic techniques to present data.

The present invention extends to methods, systems, and computer program products for using cinematic techniques to present data. A portion of data is accessed from a data repository. The portion of data has meaning based on data values contained in the portion of data. User requirements for presenting the portion of data are accessed. The user requirements indicate a user desired message to convey when presenting the portion of data.

One or more cinematic techniques are identified for presenting data in a manner that conveys the user desired message. The cinematic techniques relate to one or more of: camera position, lighting, movement, and transitions. The portion of data is presented at a display device to convey the user desired message. The user desired message is conveyed by presenting the values contained in the portion of data in accordance with the one or more identified cinematic techniques.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and the in the following claims, "cinematic techniques" are defined as techniques used in cinematography. Cinematic techniques can relate to camera position, camera angle, lighting, movement, transitions, sound, expression (depth and perspective), etc. Cinematic techniques can include: cross-cutting, jump cutting, continuity cuts, match cuts, deep focus, eye-line matching, different shots (close-up, medium, long shot, tilt, aerial, etc.), fade ins, fade outs, flashbacks, focus, iris in/iris out, key lighting, master shots, medium shots, montages, panning, point of view shots, pull back shots, reverse angles, tracking, zooming, backlighting, fill lighting, flood lighting, mood lighting, soft lighting, diegetic sound, non-diegetic sound, etc. A variety of other cinematic techniques can also be used.

FIG. 1 illustrates an example computer architecture 100 that facilitates using cinematic techniques to present data. Referring to FIG. 1, computer architecture 100 includes repository 107, presentation module 103, and display device 104. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, repository 107 stores data, such as, for example, data for user 121. Stored data can have values that give meaning to data. For example, the stored data can be sales figures. Thus, values for part numbers, sales percentages, revenues, descriptions, addresses, etc., within the stored data can give meaning to how well various items are selling.

Presentation module 103 is configured to receive a portion of stored data and user presentation requirements. User presentation requirements can indicate a user desired message to convey when presenting the portion of data. Presentation module 103 can infer the user desired message from the user presentation requirements. Based on the user desired message, presentation module 103 can identify cinematic techniques for presenting data in a manner that conveys the user desired message.

Presentation module 103 can formulate presentation data for presenting the stored data at a display device to convey the user desired message. The user desired message can be conveyed by presenting values from the stored data in accordance with the identified cinematic techniques. Presentation module 103 can send presentation data to a display device.

Display device 104 is configured to receive presentation data. Display device 104 can display the presentation data in accordance with identified cinematic techniques to convey a user desired message.

Figure 2:
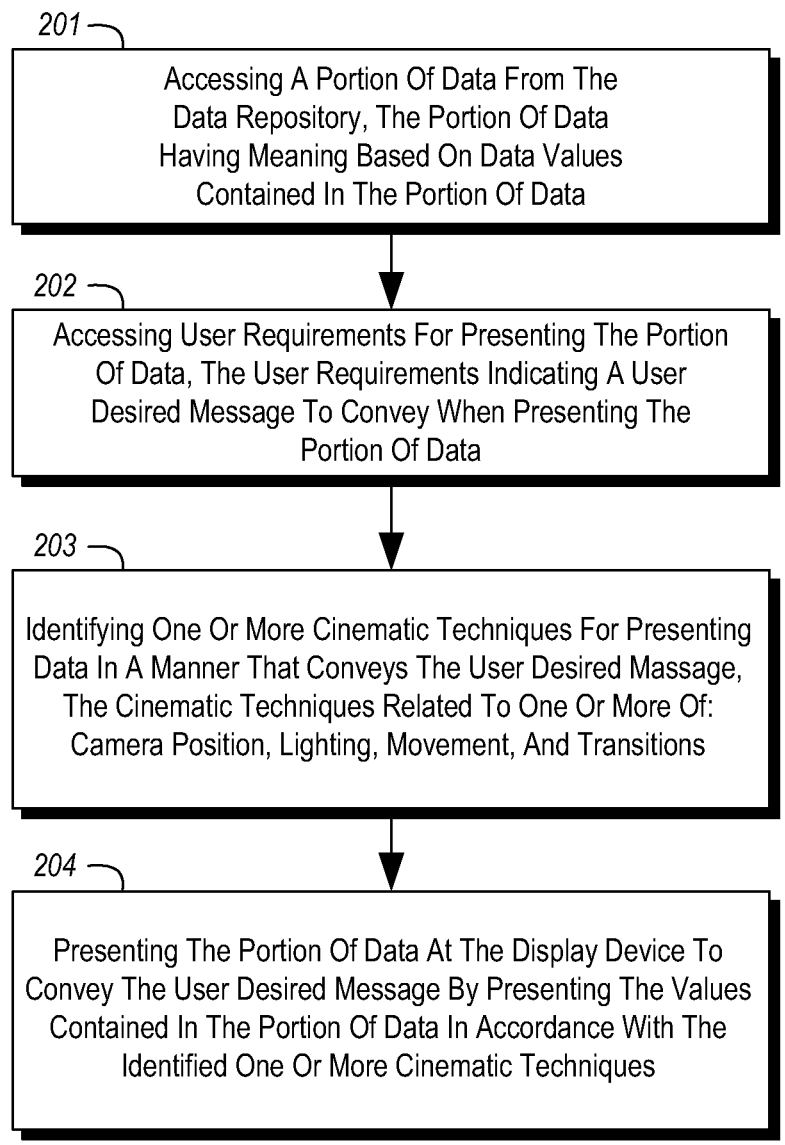
FIG. 2 illustrates a flow chart of an example method for using cinematic techniques to present data.

FIG. 2 illustrates a flow chart of an example method 200 for using cinematic techniques to present data. Method 200 will be described with respect to the components and data of computer architecture 100.

Method 200 includes an act of accessing a portion of data from a data repository, the portion of data having meaning based on data values contained in the portion of data (act 201). For example, presentation module 103 can access data 111 from repository 107. Data 111 has meaning based on values 121, 131, etc. (e.g., addresses, names, numbers, etc.) in data 111. Method 200 includes an act of accessing user requirements for presenting the portion of data, the user requirements indicating a user desired message to convey when presenting the portion of data (act 202). For example, user 101 can send user presentation requirements 113 to presentation module 103. Presentation module 103 can access user presentation requirements 113. User presentation requirements 113 can indicate a user desired message, for example, an emotional message, such as, happy, sad, professional, upbeat, sarcastic, etc. Formulating a user desired message can include the use of visual objects/properties.

Method 200 includes an act of identifying one or more cinematic techniques for presenting data in a manner that conveys the user desired message, the cinematic techniques related to one or more of: camera position, lighting, movement, and transitions (act 203). For example, presentation module 103 can identify technique 122 (panning) and technique 132 (back lighting) for presenting data 111 in a manner that conveys the user desired message indicated in user presentation requirements 113 (e.g., through visual objects/properties). Presentation module 103 can infer the user desired message from user presentation requirements 113. It may be that a plurality of different combinations of one or more cinematic techniques can be used to convey the user desired message. Presentation module 103 can select one of the plurality of different combinations to convey the used desired message.

Method 200 includes an act of presenting the portion of data at the display device to convey the user desired message by presenting the values contained in the portion of data in accordance with the identified one or more cinematic techniques (act 204). For example, presentation module 103 can formulate presentation data 123 for presenting data 111 in accordance with techniques 122 and 123. Presentation module 103 can send presentation data 123 to display device 104. Presentation data 123 can be presented at display device 104. As such, data 111 can be presented at display device 104 to convey the user desired message (in user presentation requirements 113) by presenting values 121, 131, etc., in accordance with techniques 122 and 132.

In some embodiments, data visualizations are associated with visualization metadata. The visualization metadata can indicate visual objects or properties to which data can be bound. The visualization metadata can also indicate ways in which visual objects or properties can be changed (e.g., scaled, transformed, re-colored, etc.). The visualization metadata can also indicate the constraints on values that a visual object or property can take (e.g., aesthetic rules, rules or proportion, etc).

Data metadata can be used to describe the shape of data. The data metadata can indicate whether data continuous values, or discrete, or small set of enumerable discrete values, whether there are ranges, whether there is some geometric implication (e.g. location or physical design or coordinates), etc. Data metadata can also indicate relationships within sets, such as, for example, whether it's a list of peer values or of alternatives and whether outliers can be discarded. Data metadata can also indicate whether the data is meaningfully sampleable/quantizable/smoothable.

In these embodiments, presentation module 103 can include logic for identifying and applying appropriate cinematic techniques. Presentation module 103 can go through visualization metadata and data metadata. Presentation module 103 can identify sets of visual objects/properties, mappings of visual objects/properties to elements of data, and the relationships between visual objects/properties and elements of data. Presentation module 103 can then identify the cinematic techniques or combinations thereof based on above relationships. Presentation module 103 can generate multiple choices of 'styles', apply one as the default, and show a user the 'effect' of applying this technique. However, not all the styles generated, nor all the available combinations, need be proposed for applying to a particular choice set).

Other data presentation techniques, such as, for example, charts, graphs, maps, hierarchies, etc. can be used along with cinematic techniques. These other data presentation techniques can use object color (hues, saturation, and transparency), text (font families and styles), and visibility to assist with exploring and analyzing data.

Accordingly, embodiments of the invention can be used to infer and generate cinematic techniques or combinations thereof based on a model and user action. Cinematic techniques can be used to meet the data exploration and analysis requirements of a user. As such, embodiments of the invention permit users (including non-programmers) to employ cinematic techniques (possibly in combination with other techniques) to gain insights into their data and also convey appropriate emotional messages.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for using cinematic techniques to present data in accordance with a user desired message, the method performed at a computer system including one or more processors, system memory, a data repository, and a display device, the method comprising:
   accessing a portion of data from the data repository, the portion of data having meaning based on data values contained in the portion of data;
   accessing user requirements for presenting the portion of data, the user requirements indicating a user desired message to convey when presenting the portion of data;
   accessing visualization metadata which identifies one or more visual objects and properties to which the portion of data can be bound, the visualization metadata further identifying how the visual objects and properties can be transformed and identifying constraints on values that the visual objects and properties can take;
   identifying a mapping of one or more elements of the portion of data to the one or more visual objects and properties;
   identifying, based at least on the user desired message and on the identified mapping of data elements to the visual objects and properties, one or more cinematic techniques for presenting data to convey the user desired message, the cinematic techniques being applied in accordance with the identified transformations and constraints identified in the visualization metadata; and
   presenting the portion of data at the display device using the identified one or more cinematic techniques to convey the user desired message.

2. The method as recited in claim 1, wherein accessing user requirements for presenting the portion of data comprises accessing user requirements indicating a user desired emotional message to convey.

3. The method as recited in claim 1, wherein identifying one or more cinematic techniques for presenting data in a manner that conveys the user desired message comprises identifying a panning technique for presenting data in a manner that conveys the user desired message.

4. The method as recited in claim 1, wherein identifying one or more cinematic techniques for presenting data in a manner that conveys the user desired message comprises identifying a cutting technique for presenting data in a manner that conveys the user desired message.

5. The method as recited in claim 1, wherein identifying one or more cinematic techniques for presenting data in a manner that conveys the user desired message comprises identifying a fading technique for presenting data in a manner that conveys the user desired message.

6. The method as recited in claim 1, wherein identifying one or more cinematic techniques for presenting data in a manner that conveys the user desired message comprises:
 inferring data metadata indicating the shape of the accessed portion of data; and
 identifying a cinematic technique based on the data metadata.

7. The method as recited in claim 1, wherein presenting the portion of data at the display device to convey the user desired message comprises using other presentation techniques along with the cinematic techniques to convey the user desired message.

8. The method as recited in claim 1, wherein presenting the portion of data at the display device to convey the user desired message comprises presenting the portion of data to aid in data exploration of the data repository.

9. A computer program product for use at a computer system which includes a data repository and display device, the computer program product for implementation of a method for using cinematic techniques to present data, the computer program product comprising one or more computer hardware storage devices having stored thereon computer-executable instructions that, when executed at one or more computer processors, cause the computer system to perform the following:
 access a portion of data from the data repository, the portion of data having meaning based on data values contained in the portion of data;
 access user requirements for presenting the portion of data, the user requirements indicating a user desired message to convey when presenting the portion of data;
 access visualization metadata which identifies one or more visual objects and properties to which the portion of data can be bound, the visualization metadata further identifying how the visual objects and properties can be transformed and identifying constraints on values that the visual objects and properties can take;
 identify a mapping of one or more elements of the portion of data to the one or more visual objects and properties;
 identify, based at least on the user desired message and on the identified mapping of data elements to the visual objects and properties, one or more cinematic techniques for presenting data in a manner to convey the user desired message, the cinematic techniques being applied in accordance with the identified transformations and constraints identified in the visualization metadata; and
 present the portion of data at the display device using the identified one or more cinematic techniques to convey the user desired message.

10. The computer program product as recited in claim 9, wherein computer-executable instructions that, when executed, cause the computer system to access user requirements for presenting the portion of data comprise computer-executable instructions that, when executed, cause the computer system to access user requirements indicating a user desired emotional message to convey.

11. The computer program product as recited in claim 9, wherein computer-executable instructions that, when executed, cause the computer system to identify one or more cinematic techniques for presenting data in a manner that conveys the user desired message comprise computer-executable instructions that, when executed, cause the computer system to identify one or more of: a panning technique, a cutting technique, and a fading technique, for presenting data in a manner that conveys the user desired message.

12. The computer program product as recited in claim 9, wherein computer-executable instructions that, when executed, cause the computer system to identify one or more cinematic techniques for presenting data in a manner that conveys the user desired message comprise computer-executable instructions that, when executed, cause the computer system to
 infer data metadata indicating the shape of the accessed portion of data; and
 identify a cinematic technique based on the data metadata.

13. A computer system, the computer system including:
 one or more processors;
 system memory; and
 one or more computer storage media having stored there on computer-executable instructions representing a presentation module, the presentation module configured to:
 access a portion of data from the data repository, the portion of data having meaning based on data values contained in the portion of data;
 access user requirements for presenting the portion of data, the user requirements indicating a user desired message to convey when presenting the portion of data;
 access visualization metadata which identifies one or more visual objects and properties to which the portion of data can be bound, the visualization metadata further identifying how the visual objects and properties can be transformed and identifying constraints on values that the visual objects and properties can take;
 identify a mapping of one or more elements of the portion of data to the one or more visual objects and properties;
 based at least on the user desired message and on the identified mapping of data elements to the visual objects and properties, identify one or more cinematic techniques for presenting data in a manner that conveys the user desired message, the cinematic techniques being applied in accordance with the identified transformations and constraints identified in the visualization metadata; and
 present the portion of data at the display device using the identified one or more cinematic techniques to convey the user desired message.

14. The computer system as recited in claim 13, wherein the presentation module configured to access user requirements for presenting the portion of data comprises the presentation module being configured to access user requirements indicating a user desired emotional message to convey.

15. The computer system as recited in claim 13, wherein the presentation module configured to identify one or more cinematic techniques for presenting data in a manner that conveys the user desired message comprises the presentation module being configured to identify a panning technique for presenting data in a manner that conveys the user desired message.

16. The computer system as recited in claim 13, wherein the presentation module configured to identify one or more cinematic techniques for presenting data in a manner that conveys the user desired message comprises the presentation module being configured to identify a cutting technique for presenting data in a manner that conveys the user desired message.

17. The computer system as recited in claim 13, wherein the presentation module configured to identify one or more cinematic techniques for presenting data in a manner that conveys the user desired message comprises the presentation module being configured to identify a fading technique for presenting data in a manner that conveys the user desired message.

18. The computer system as recited in claim 13, wherein the presentation module configured to identify one or more cinematic techniques for presenting data in a manner that conveys the user desired message comprises the presentation module being configured to:

infer data metadata indicating the shape of the accessed portion of data; and identify a cinematic technique based on the data metadata.

19. The computer system as recited in claim 13, wherein the presentation module configured to present the portion of data at the display device to convey the user desired message comprises the presentation module being configured to use other presentation techniques along with the cinematic techniques to convey the user desired message.

20. The computer system as recited in claim 13, wherein the presentation module configured to present the portion of data at the display device to convey the user desired message comprises the presentation module being configured to present the portion of data to aid in data exploration of the data repository.

* * * * *